Nov. 19, 1940.  W. E. WENZEL ET AL  2,222,333
RUBBER BED AND TYPE HOLDER THEREFOR
Filed Jan. 20, 1939
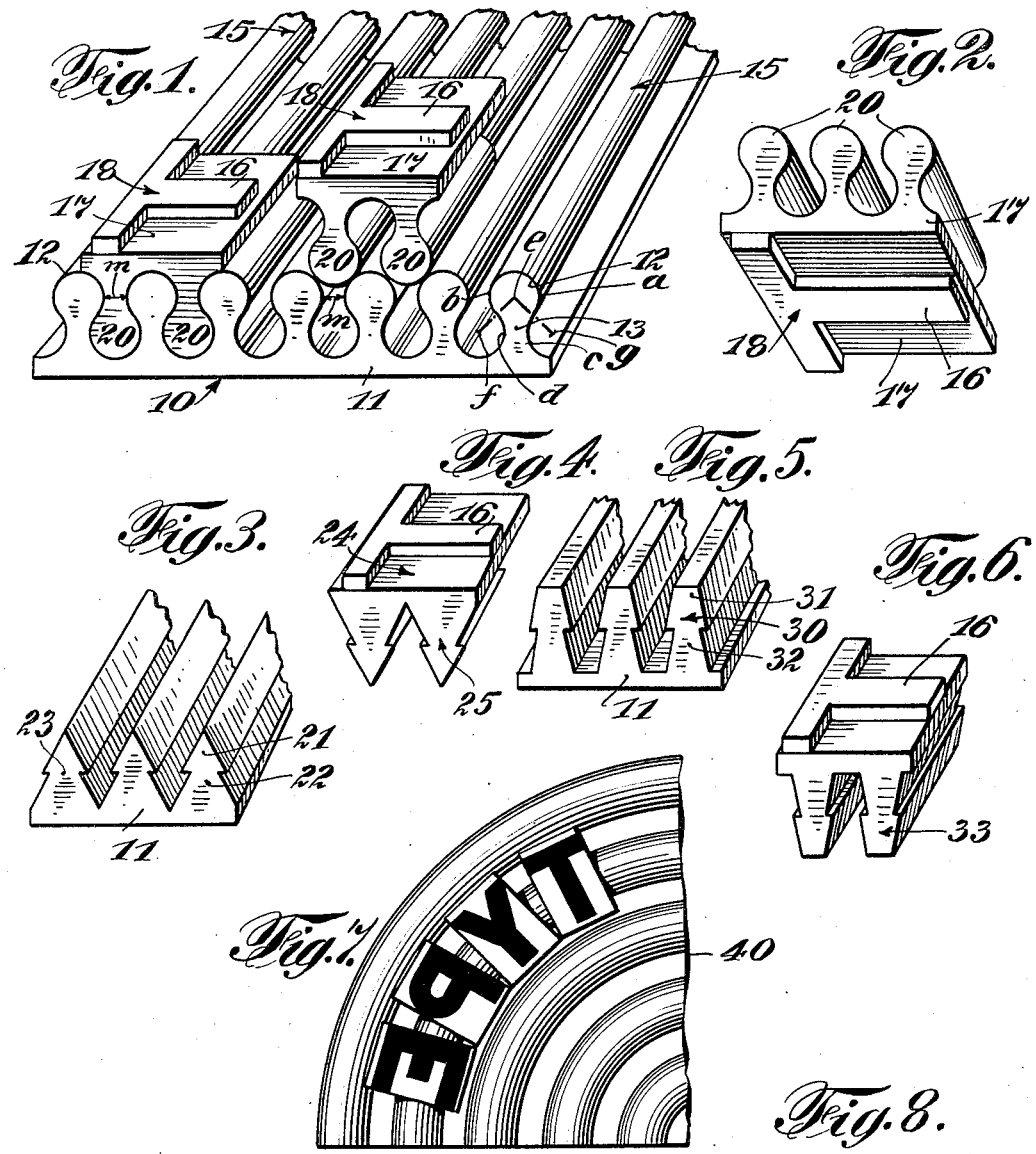
INVENTORS
Walter E. Wenzel
Friedrich Artur Kramer
BY C. P. Goepel
their ATTORNEY.

Patented Nov. 19, 1940

2,222,333

UNITED STATES PATENT OFFICE 2,222,333

RUBBER BED AND TYPE HOLDER THEREFOR

Walter E. Wenzel, New City, and Friedrich Artur Kramer, Spring Valley, N. Y.

Application January 20, 1939, Serial No. 252,022

2 Claims. (Cl. 101—381)

This invention relates to rubber type and rubber beds therefor.

The particular object of the invention is to provide a rubber bed to which rubber type may be applied in such a manner that the type is securely held in position. Also, to enable the type to be shifted into proper place, so that composite combinations may be made in accordance with the compositor's requirements.

For this purpose, the invention consists of a bed having a plurality of spaced members each of a configuration like the other and forming spaces therebetween, and a type holder having members each of a configuration like the other and forming spaces therebetween.

The invention consists further in the combination of such a bed and such a type holder.

In the accompanying drawing:

Figure 1 is a perspective view of the improved bed with the improved type applied thereto;

Figure 2 is a sectional elevational view of one form of type holder;

Figure 3 is a partial perspective view of another form of bed;

Figure 4 is a similar view of the type holder corresponding to the bed shown in Figure 3;

Figure 5 is a similar view of still another form of bed;

Figure 6 is a similar view of the type holder corresponding thereto;

Figure 7 shows the application of the type to a circular bed; and

Figure 8 shows a plan view of the bed, with two different applications of type thereto, one showing an angular arrangement of the type, in which the type holders are angularly disposed in respect to the base of the type, and the other in which one side of each type base is in alignment.

Similar characters of reference indicate corresponding parts throughout the various views.

Referring to the drawing, and more particularly to Figures 1 and 2, the bed 10 has a base portion 11 extending the width and length of the improved bed. This base portion 11 is common to all embodiments of the bed, as shown in Figures 3 and 5.

Upwardly from the bed portion a plurality of members extend, each shaped like the other and spaced from each other with spaces having the same outline or configuration as the members themselves. Each member in Figure 1 has a ball-shaped upper end 12, in cross section, and is constricted below the same to form a contracted shank 13 also curved. In other words, each member has a configuration of two oppositely disposed reverse sinuous curves or S's angularly disposed. Curve $a$ is opposite to curve $b$, and curve $c$ is opposite to curve $d$. Curve $a$ is reverse to curve $c$, and curve $b$ is reverse to curve $d$. The center of curvature $e$ of curve $a$ and the center of curvature $f$ of curve $d$ are on a line $ef$ angularly disposed to the bottom horizontal line of the bed 10, and the center of curvature $e$ of curve $b$, and the center of curvature $g$ of curve $c$ are on a line $eg$ angularly disposed to the bottom horizontal of the bed 10, but in the opposite direction to line $ef$. With the shape described, each member 15 extends longitudinally of the base portion 11, as shown in Figure 1. From this it will be noted that the embodiment shown in Figure 1 has seven longitudinally extending members each of the same cross sectional shape. In view of the construction described, the upper ball-shaped portions of the members are spaced apart a distance $m$.

With the construction described, the type holder is constructed, in accordance therewith. The type 16 itself made of rubber or the like is well-known. It is made part of a layer 17 from which extend members 20 having the same shape or configuration as the members 15 of the bed. Due to the inherent resiliency of the material from which the bed 10 and type holder 18 are made, the members 20 of the typeholder 18 may be inserted into and through the spaces $m$, between adjacent members 15 of the bed 10, and thereby when the type holder is entirely inserted into operative position, the members 20 fill up the spaces between the members 15 in their entirety, and the members 20 and 15 become, so to say, one, and with layer portion 17 and layer portion 11 form a rectangular portion when type holder 18 has been inserted entirely across the bed 10, just as if one solid piece of rubber or the like were present. When a line of type has been set up, for instance, longitudinally of the type holder which has been entirely inserted in Figure 1, the interplacing of the members is such that, so to say, a single or integral member has been formed.

With the principle underlying this invention as hereinbefore described, modifications suggest themselves. So, in Figures 3 and 4 a spear-shaped top portion 21 is provided on each member, superposed upon a pyramidal base portion 22, whereby the space between each two members 23 is exactly the same as that of one extension itself. In consequence, the type holder 24 has members 25 of the same configuration as the members 23 of the bed portion 11, excepting upside down. The insertion of the holder 24, by the insertion of the members 25 into the intervening spaces of the bed portion 11, brings about an interlocking and a unity position with the bed.

In Figures 5 and 6 the members 30 have angularly blunted upper portion 31 supported by constricted neck portion 32, again forming spaces between adjacent members of the same configuration as the members themselves. The members 33 of the holder in Figure 6 have the same configuration as the spaces between the members 30 of Figure 5.

The type holders shown in Figure 2 may also be applied to a circular bed 40, as shown in Figure 7.

In Figure 8 is shown a bed constructed like that shown in Figure 1. To show how the invention described is applicable to italic or script type, the type base is disposed at an angle to the type holder. The type holder registers in parallelism with the spaces in the bed. Hence, when using italic or script type, the type holders are arranged at an angle to the type base, that is, to the type face.

In order to show how the invention described is applicable to such type as it is desired to have of different sizes, the type bases have one side in alignment with each other. In a case, the smallest type, as for instance T, has only one type holder member, and off center. Similarly the next size S. In the type E, two holder members can be provided, and the type face is off center. The largest type B has two holder members, and the type face is centrally disposed. These examples are shown to illustrate the various uses in the typesetting art, to which the improved invention may be applied.

The spaces formed between the members of the bed are substantially exactly equal in configuration to the configuration of the type holder members. To have it less than the space would bring about looseness. To have it equal to or slightly greater than the space brings about a slight hugging action.

It is seen that the improved bed and type holder enable the type holder to be snapped in position when desired and readily changed, connected or properly positioned. The improvement permits proper alignment, the bed is free of all side walls, and the distorting of type face is avoided.

Most all the present day movable rubber type are set in holders with fixed side walls of wood or metal into which the type is squeezed or anchored into position. It is readily understood how these holders control the amount of display work possible. The length of the side walls, the width between the side walls which govern the size type, and the fixed space taken up by the side walls themselves illustrates the limit of display work possible with these holders. There are some holders on the market where the side walls are movable, they can be taken out of the base and placed in grooves in the base, to either increase or decrease the width of the channel between the side walls; these holders, too, are limited to the amount of the grooves and the spacing of them in the base, also only type sizes in multiples of the spacing between the fixed grooves in the base can be used.

The improvement produces also a bed in combination with the type therefor, free of all metal or wood side walls, either fixed or movable and a means by which a printer, wood or metal engraver, sign painter, advertiser, illustrator, etcher, or anyone interested in quick set-ups by simple and inexpensive operation can set copy of any display at will.

The material used in the bed is rubber and is cast in molds by vulcanization; therefore, the limit of the size of bed is governed only by the size of the mold and vulcanizer. A bed three feet square is possible to cast, and from that any size bed can be cut down to the size of a postage stamp; for printer's use the rubber bed can be mounted on wood or metal base.

Most all other forms of rubber type are set by squeezing into metal or wood slots, channels or grooves of either fixed or movable side walls, thereby distorting the face of the type, limiting the size and spacing of the type and minimizing the amount of display work possible with these holders. The operation of our invention is simple, by setting the type on the top of the bed in between the members, and adjusting the type to the position wanted, then with light pressure pressing into the bed, that is all that is necessary; anchoring quads at the end of the lines or spacers between the words are unnecessary, as the members are snug enough to hold the bed and type together in one solid unit sufficiently enough for normal printing operations.

Rubber type has not been used extensively due to the limitations of the holders, and the poor results obtained from them. Their use was mainly to replace rubber stamps and the like where time was a factor. Our invention covers a far greater field. It will be of great advantage to printers and others that print posters, throw-aways, bulletins, advertising cards, or any printed matter wanted at short notice and still inexpensive to print.

Be it understood that in the use of our invention it is far cheaper and simpler in operation than with the printer's metal or wood type now in use. No spacing quads are needed at the ends or between the words, consequently no justifying of each line is necessary as with wood or metal type, nor is it necessary to lock the set-up as with wood or metal type. All this procedure is eliminated; the simple operation is to lay the type on the bed in between the members in whatever form or display is wanted, then snap them into the bed with a light pressure of the hand. The bed and type being constructed of rubber, they make an airtight and suction-like union, tight enough to withstand any printing operation.

This rubber bed can be mounted on type high wood or metal base, and can be used together with printer's metal type. Printers have been eagerly waiting for a movable rubber type that was practical to use and adaptable to display work, and gave fairly good results in the finished job. The opportunity is theirs to use a soft ink such as aniline ink, used with rubber type, in preference to the hard oil inks used with metal and wood type.

For color work, or copy printed in two or more colors, our invention is ideal as there is no justifying of lines, no spacers or anchors used, and consequently no lock-up necessary. The individual characters are free to be lifted out at will without disturbing the rest of the set-up, and again be put back in the same place in perfect alignment.

Our invention can also be used on cylinder presses. The rubber bed can easily be curved to the curvature of the cylinder, and can be used in the same manner as the flat base, or can be mounted on rubber stamps, the rubber bed acting as a cushion base for receiving rubber dies with holding members cast on the back thereof, making unnecessary the use of glue or cement to hold the die to the cushion. This is an added feature to the rubber stamp. Several different dies could be used with the one stamp mount, just by changing the dies and releasing one and snapping on another.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations, modifications and adaptations as come within the scope of the appended claims.

What we claim is:

1. In a type bed and rubber type holder, the combination of a bed having a base, a series of like members thereon running in parallel spaced relation with each other, each member having a configuration comprising an upper part and a lower part each of varying thickness, the upper part having a larger cross section than the lower part, the upper part being flexibly displaceable in respect to the lower part, and a type holder having a base, a member thereon having a configuration operatively conforming to the configuration formed by the upper and lower parts of the members of the aforesaid bed, said type holder member having a cross section comprising an upper part and a lower part of varying thickness, with the upper part of greater thickness than the lower part and flexibly displaceable in respect to the lower part, said type holder member releasably engaging by frictional locking action the operatively conforming configuration of the bed, with said type holder member resiliently deranging the members of the bed when engaging or disengaging the same.

2. A combination like claim 1, wherein the cross sectional contours of the members of both the bed and type holder are curved.

WALTER E. WENZEL.
FRIEDRICH ARTUR KRAMER.